Patented June 22, 1937

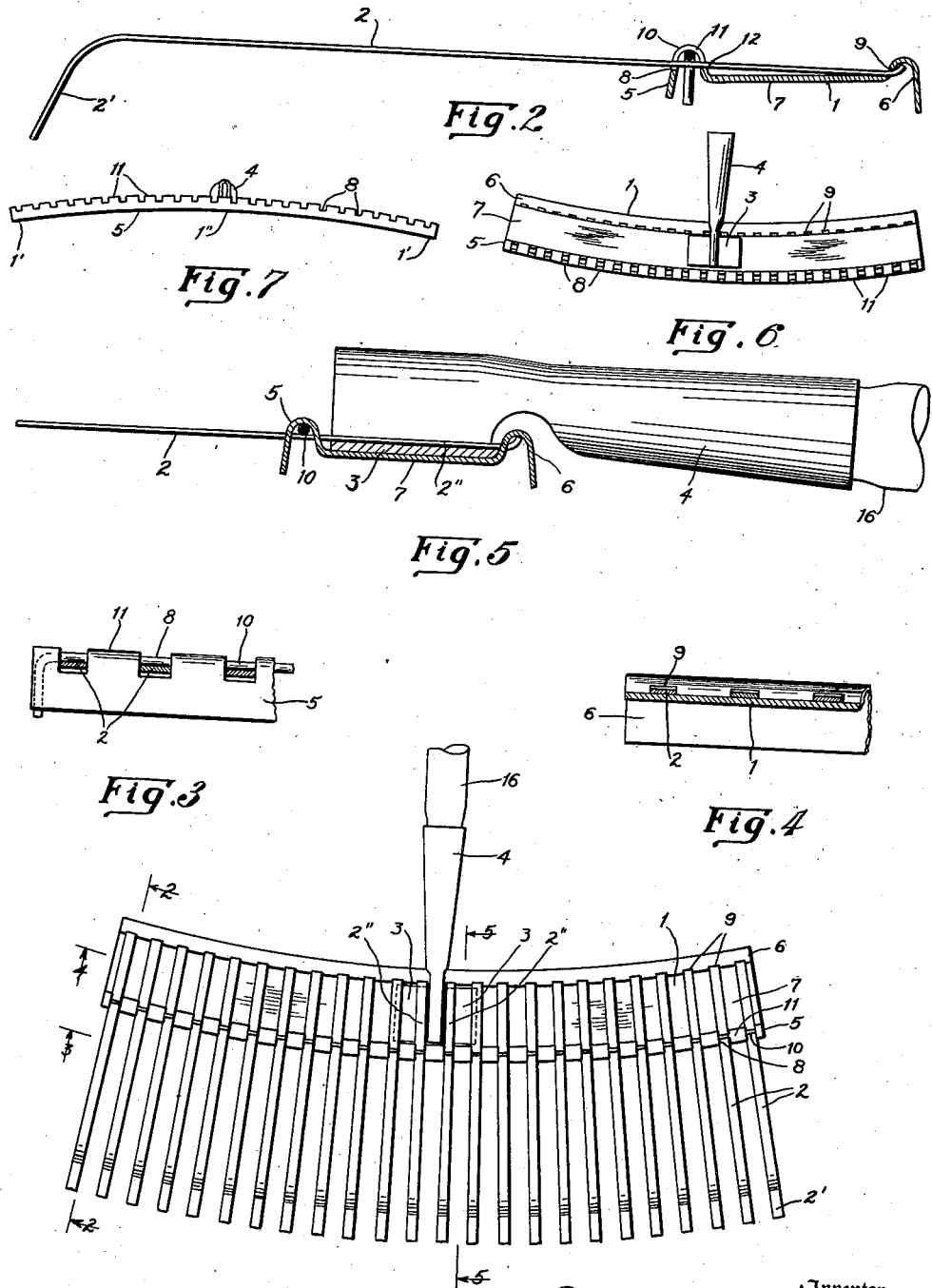

2,084,434

UNITED STATES PATENT OFFICE 2,084,434

RAKE

Charles H. Dennis, Jackson, Mich., assignor to The American Fork & Hoe Company, Cleveland, Ohio, a corporation of Ohio Original application April 6, 1931, Serial No. 527,864. Divided and this application November 30, 1932, Serial No. 644,969

4 Claims. (Cl. 55—10)

My invention relates to rakes and relates more particularly to rakes of the so-called "Broom rake" type.

My present application is divisional of my previously filed application, Serial No. 527,864, filed April 6, 1931, for improvements in rakes, which broadly covers the rake proper such as is illustrated in the drawing accompanying this specification, the present application being more particularly limited to certain improvements to rake head and tine constructions hereinafter fully described and claimed.

An object of my invention is to provide an improved rake wherein the tines are individually separable from the head of the rake.

Another object of my invention is to provide an improved rake, which, while it permits a fairly easy individual removal and replacement of the tines, will however, hold the same securely locked against accidental removal.

Another object of my invention is to provide an improved rake which will be extremely light and durable, inexpensive to manufacture, and economical and efficient in use.

Another object of my invention is to provide an improved rake of the broom type employing flat spring tines.

Another object of my invention is to provide an improved rake of the broom type employing flat spring tines, which are end-wise insertable and removable from the rake head.

Another object of my invention is to provide an improved rake employing flat spring tines wherein the cost of manufacture is low.

Another object of my invention is to provide an improved rake of the type described wherein sweeping of leaves or other trash may be effectively accomplished by an operator standing erect and using the rake in the manner of a broom.

Other objects of my invention, and the invention itself, will become more apparent by reference to the following description of certain embodiments of my invention, and in which description reference will be had to the accompanying drawing forming a part of said embodiment.

In the drawing:

Fig. 1 is a plan view of a rake embodying the principles of my invention, the handle illustrated as having the handle broken away;

Fig. 2 is a section taken on the line 2—2 of Fig. 1, but enlarged to full size;

Fig. 3 is a section taken on the line 3—3 of Fig. 1, but enlarged to full size;

Fig. 4 is a section taken on the line 4—4 of Fig. 1, but enlarged to full size;

Fig. 5 is a section taken on the line 5—5 of Fig. 1, but enlarged to full size;

Fig. 6 and Fig. 7 are views respectively in plan and front elevation of the rake head of the rake of Figs. 1 to 5 inclusive, per se, with its rigidly secured handle socket.

The rake of my present invention is illustrated in the drawing in a number of different embodiments. In the first embodiment illustrated in Figs. 1 to 5 inclusive, the handle 16 projected within a tapered tubular metal socket 4 carries a transversely extending curved channeled cross head 1 which in turn supports the rear end portions of a plurality of laterally spaced thin flat elongated resilient metal tines 2, which project forwardly therefrom and are provided with free down-turned ends 2'. The handle socket element 4 is angularly secured to the cross head in any suitable manner such as by laterally extending flanges 3 thereof riveted or welded thereto or clamped between contiguous tine portions such as 2'' and the intermediate body portion 7 of the cross head.

The cross head is formed by providing a horizontally arcuate strip of sheet metal which is preferably vertically arched, see Figs. 6 and 7, with front and rear channels, 5 and 6 respectively, which are both of inverted U-form, in transverse section, the outer pendent portions extending preferably below the level of the adjacent intermediate portion 7.

These channels 5 and 6 form tine supports which maintain the tines substantially spaced from the intermediate or body portion 7 permitting flexing of the intermediate unsupported tine portion in a manner hereinafter described.

The tines are secured in place by being projected rearwardly through longitudinally aligned slots or notches 8 of the foremost channel 5 and apertures 9 through the foremost wall of the rearmost channel, both notches and apertures being of widths but very slightly in excess of the widths of the tines, and the tines each having an up-turned short bend at their rear ends to interlock with the interior surfaces of the rearmost channel to prevent longitudinal removal of the tine in the head. Each tine is inserted first through one of the apertures 9, while considerably elevated above the slot 8, then rotated downwardly to position where the tines may all be securely locked in place by a wire rod key 10 preferably arcuately pre-formed, projected from one side through to the other side of the rake head between the channel loops 11, intermediate the notches 8, and the upper surfaces of all of the tines 2 which engage at 12 with a rearmost edge of the slot 8.

In the embodiment of my invention described herein, each of the tines is supported on the cross head by two longitudinally spaced portions of the cross head so engaging the tine that when the rake is put into use and the operator sweeping leaves or trash exerts downwardly directed pressure on the handle which is transmitted by the rake head to the tines, pressure engagement of the tip ends of the tines with the ground will cause the tines to resiliently flex. When this occurs, due to the fact that the engagement by the foremost tine-supporting flange with the tine is a fulcruming engagement, the tine may rock slightly on the foremost flange to effect a limited amount of resilient yielding by the tine portion disposed just rearwardly of the foremost support.

In the said embodiment described, it is noted that the body portion of the cross head, intermediate the flanges, is so spaced from the portions of the tines located intermediate the flanges as to permit yielding of this portion of the tines toward the said body portion. In such constructions the tines are much less susceptible to breakage than in constructions wherein the tines are rigidly clamped within the foremost support, causing the tine to be subject to severe localized bending of the tine beyond the elastic limit, contiguous to the foremost support.

Having thus described my invention in a certain embodiment, I am aware that numerous and extensive departures may be made from the embodiment herein illustrated and described but without departing from the principles of my invention.

I claim:

1. In a broom rake, a handle, an elongated cross head extending transversely of the handle, a plurality of resilient metal tines having ground-engageable portions at one end and a hook portion at the other end, the tines extending forwardly from the cross head, forwardly and rearwardly spaced channel portions on the head, each tine loosely engaging the forward channel portion and having the hook portion disposed within the rear channel portion, and a common removable key disposed within the forward channel portion permitting longitudinal shifting of the tines therein and preventing disengagement of the tine hook portion from the rear channel.

2. In a broom rake, a handle, an elongated cross head extending transversely of the handle, a plurality of resilient metal tines having ground-engageable portions at one end and a hook portion at the other end, the tines extending forwardly from the cross head, forwardly and rearwardly spaced channel portions on the cross head, each tine being disposed above the cross head and engaging the front channel portion and having the hook portion disposed within the rear channel portion, a common removable key disposed within the front channel portion between the tines and the channel to prevent disengagement of the hook portion with the rear channel portion while permitting longitudinal shifting of the tines relative to the front channel portion, the portions of the tines between the channel portions being adapted to bend responsive to flexing of the tine portions extending forwardly from the cross head.

3. In a broom rake, a handle, an elongated cross head extending transversely of the handle, a plurality of resilient metal tines having ground-engageable portions at one end and a hook portion at the other end, the tines extending forwardly from the cross head, forwardly and rearwardly spaced channel portions on the head, each tine lying in a notch in the forward channel portion and having the hook portion projected through a perforation in the wall of the rear channel portion and hooked into the channel portion and a common removable key disposed within the forward channel portion loosely holding the tines in the notches and permitting longitudinal shifting of the tines therein and preventing disengagement of the tine hook portion from the rear channel.

4. In a broom rake, a handle, an elongated cross head extending transversely of the handle, a plurality of resilient metal tines having ground-engageable portions at one end and a hook portion at the other end, the tines extending forwardly from the cross head, forwardly and rearwardly spaced channel portions on the cross head, each tine being disposed above the cross head and in a notch in the front channel portion and having the hook portion projected through a perforation in the wall of the rear channel portion and hooked into the rear channel portion, a common removable key disposed within the front channel portion between the tines and the bottoms of the notches to prevent disengagement of the hook portion with the rear channel portion while permitting longitudinal shifting of the tines relative to the front channel portion, the portions of the tines between the channel portions being adapted to bend responsive to flexing of the tine portions extending forwardly from the cross head.

CHARLES H. DENNIS.